United States Patent Office 3,055,155
Patented Sept. 25, 1962

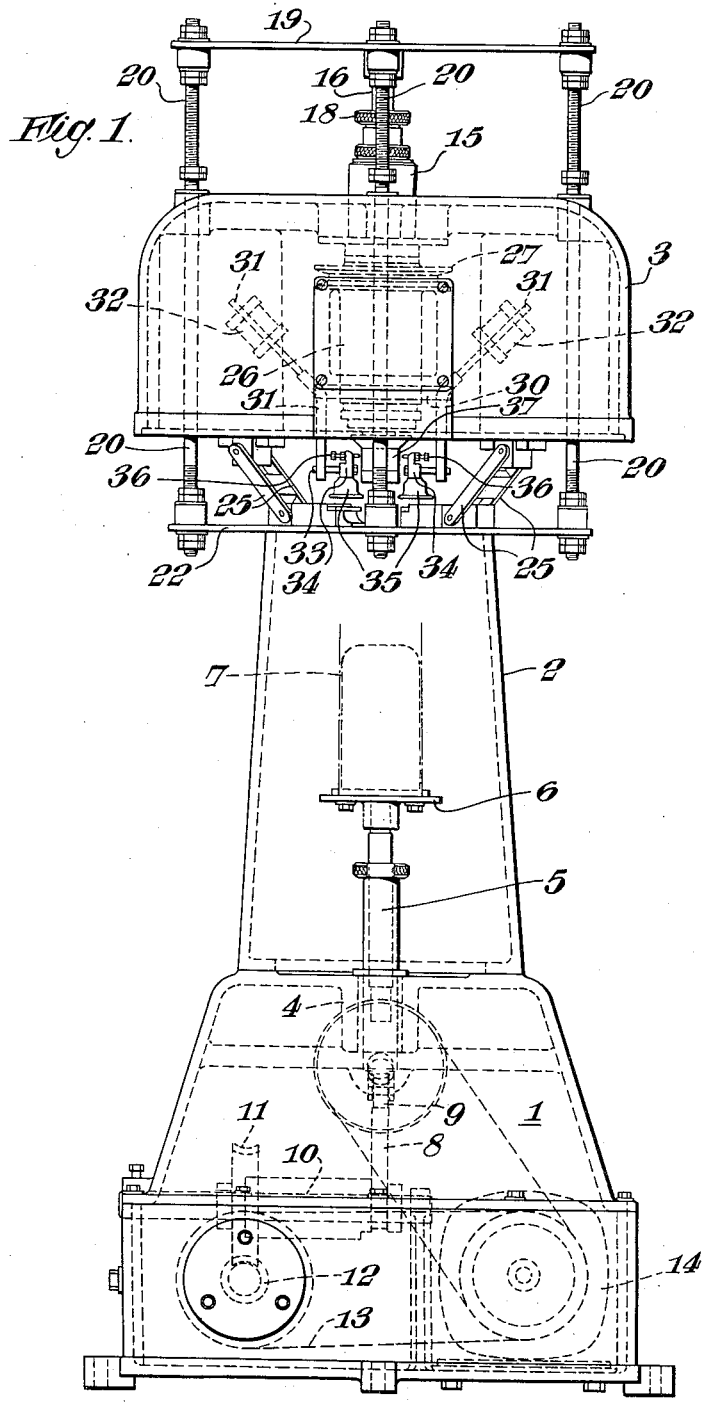

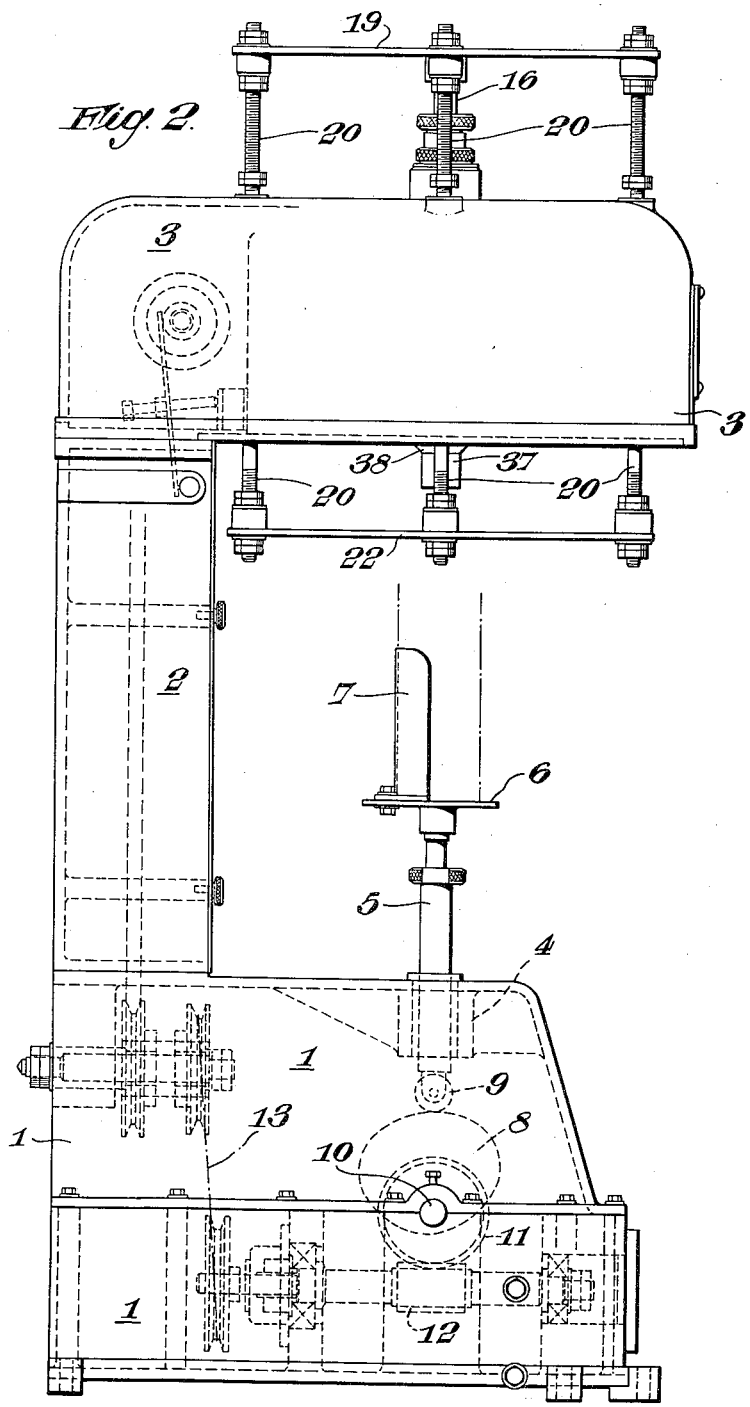

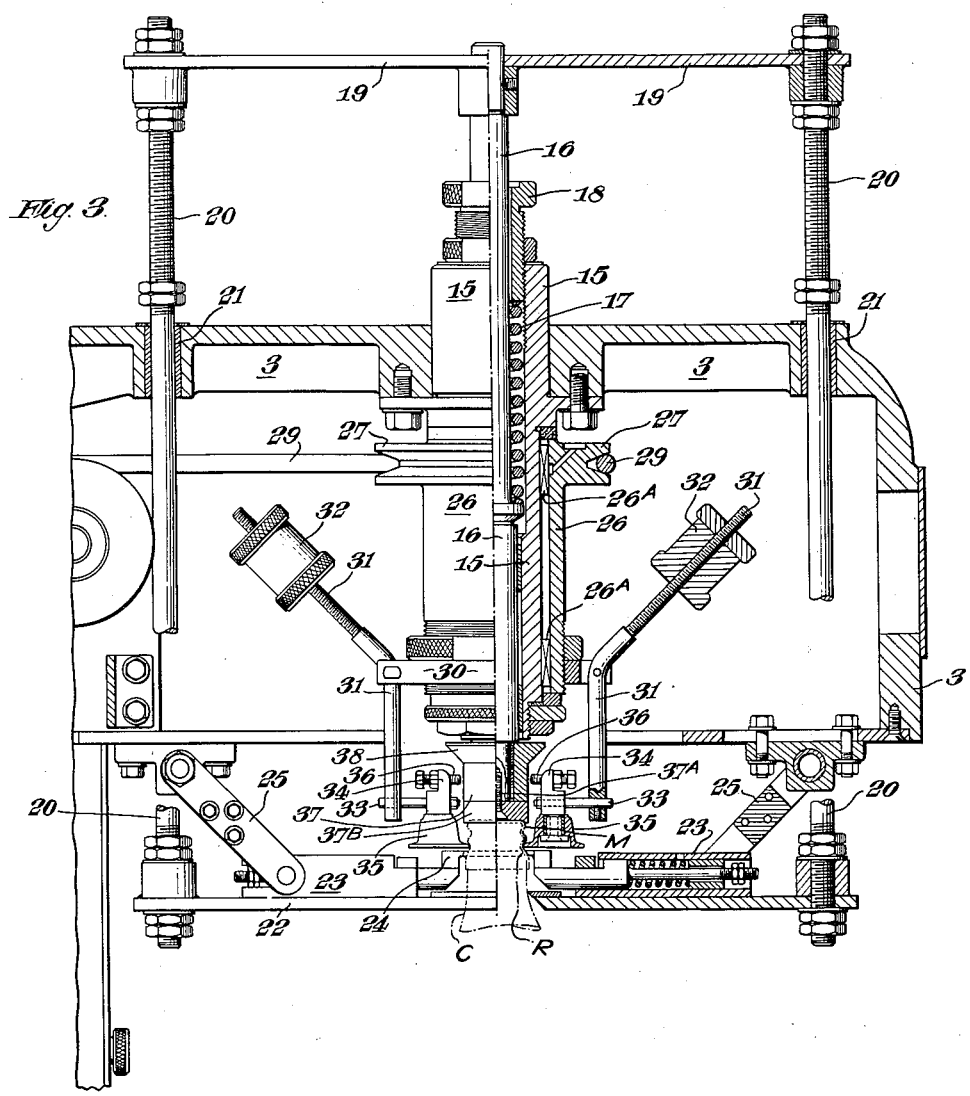

3,055,155
APPARATUS FOR SECURING CAPS OR STOPPERS TO BOTTLES AND OTHER SUITABLE CONTAINERS
Frank Fox, Beechwood House, Illingworth, Halifax, England
Filed July 28, 1960, Ser. No. 45,976
1 Claim. (Cl. 53—335)

The invention has as its object to provide apparatus for securing or sealing caps or stoppers in a tamper-proof manner to bottles and other suitable containers, the said caps and a method of effecting the sealing action being described in the complete specification of our co-pending U.S. Patent application Serial No. 842,469, filed September 25, 1959.

Caps or stoppers according to the said application are sealed upon the mouths of bottles or containers by forming a tag or lug or tags or lugs in the ductile metal skirts of the caps, which tag or tags is or are pressed into engagement with a peripheral groove of angular or other suitable cross-sectional shape formed in the container.

According to the present invention the apparatus for securing and sealing caps or the like to bottles or other suitable containers includes means for moving a container and pre-positioned cap relative to a stationary head in a manner whereby the said container automatically actuates movable means upon the said head to protract a die or dies into engagement with the skirt of the cap to distort a portion or portions of the said skirt into engagement or conformity with an external groove, channel or the like. If desired, the apparatus may also include means for automatically causing the skirt of the cap to conform to the screw-threaded neck or portion of a bottle or the like approximately simultaneously with the operation of the die or dies.

In order that the invention may be fully and clearly comprehended the same will now be described with reference to the accompanying drawings, in which:

FIGURE 1 is a front elevation of a machine or apparatus for securing or sealing caps or stoppers to containers and more or less simultaneously forming a screw-thread upon the skirts of the caps, constructed according to one embodiment of the invention.

FIGURE 2 is an end view of FIGURE 1.

FIGURE 3 is an enlarged end elevation partly in section, of the upper portion of the machine illustrated in the previous figures.

The machine or apparatus incorporates an appropriately shaped frame or pedestal constituted of a hollow base 1, a perpendicular column 2 and a head 3, the said head and pedestal being arranged in spaced relationship to provide a gap and render the machine open-sided.

Supported in a bearing 4 in the base is a vertical plunger 5 whose upper end carries a platform 6 and a locating member 7 for a bottle or container. The plunger is adapted to have a vertical reciprocatory or rising and falling motion imparted thereto.

For instance, in the example of the invention illustrated in the drawings the plunger is actuated by the periphery of a suitably contoured rotary cam 8 continuously engaging the lower end of the plunger which is preferably furnished with an antifriction roller 9.

The cam 8 is secured to a shaft 10 carrying a worm wheel 11 driven by a worm 12 forming part of appropriate reduction gear mechanism deriving its drive by belt 13 from an electromotor 14.

It must be understood however that several other ways of imparting motion to the plunger 5 could be employed such as pneumatic or hydraulic means or lever mechanism.

The stationary head 3 carries a sleeve 15 housing a central vertical shaft 16 normally retained in a downwardly extended position by a surrounding helical spring 17 interposed between a swelling on the said shaft and an adjustable nut 18 screwing into the top end of the sleeve 15, the shaft 16 being in axial alignment with the aforesaid plunger 5.

The upper end of the shaft 16 supports a circular disc 19 and near the periphery of the latter there are attached a number of vertical pillars 20 passing through bearings 21 in the upper part of the head 3 and whose lower ends are secured to a centrally bored plate 22.

Mounted in diametrically opposite relationship upon the upper face of the plate 22 are two housings 23 each enclosing a spring-loaded slidable die or punch 24 coupled by articulated links 25 to the lower part of the stationary head 3. This is shown in FIG. 3. It must be understood that only one or more than two housings 23, dies 24 and links 25 may be employed if desired.

Upon the aforesaid sleeve 15 is a concentric collar 26 whose upper end has a grooved flange 27 forming a pulley.

26A are antifriction or roller bearings.

The collar 26 is adapted to be driven by belt 29 from the motor 14 through any suitable arrangement of shaft, pulley and belt gearing as shown in the drawings. Or chains and sprockets or any other well known type of gearing could be employed to drive the collar.

Concentrically secured to the lower end of the collar 26 is a ring 30 near the periphery of which are pivoted two bent levers 31, although three or more may be used. The upper end of each lever is provided with an adjustable counterweight 32 and the lower ends depend perpendicularly downward, each of the ends carrying a pin 33 disposed radially to the shaft 16. Secured to each pin 33 is a boss 34, each boss supporting a freely mounted flanged wheel 35 upon a perpendicular stud. Also secured to each boss 34 is a radially disposed adjustable bolt 36.

Rotatably mounted upon the bottom end of the shaft 16 is a barrel 37 furnished with a tapered external flange 38. 37A is an axial screw for securing a dished plate 37B to the bottom end of the barrel, said dished plate being shaped to accommodate the mouth or neck of a container C upon which has been placed a ductile dished or skirted metal cap or closure member M of well known kind (see broken lines in FIGURE 3). The exterior of the container has a peripheral groove or recess R therein of suitable cross-sectional shape as already stated.

The operation of the apparatus is as follows.

Upon the motor 14 being started the plunger 5 is caused to vertically reciprocate by reason of the cam 8. Simultaneously with the plunger motion, the combined pulley and collar 27 and 26 and the ring 30 carrying the levers 31 rotate about the shaft 16.

When the plunger is down a bottle is positioned upon the platform 6 either manually or mechanically. The externally screw-threaded mouth or neck of the bottle C carries a dished cap or closure member M of well known kind whose skirt portion loosely encloses the threaded part of the bottle and an external peripheral groove or channel R formed therein.

Thereafter the plunger 6 raises the bottle for the neck thereof to pass through the central bore in the plate 22. During the said rising motion the lower ends of the levers 31 which move centrifugally radially inward on account of the counterweighted opposite ends cause the flanged wheels 35 to operate upon the upwardly moving bottle neck to force the skirt of the cap to conform to the screw-threaded portion of the neck.

After the cap M on the mouth or upper end of the bottle has nested in the dished end of the plate 37B on the bottom end of the shaft 16, the latter is pressed upward against the action of the spring 17. The said movement of the shaft 16 is transmitted to the plate 22 by the pillars 20 and as the distance between the plate 22 and the head 3 diminishes the articulated links 25 automatically protract or actuate the slidable dies or punches 24 radially inward to deform the corresponding portions of the cap into the aforesaid co-acting groove or channel in the bottle as shown in FIGURE 3.

At this stage the plunger begins to descend; the dies or punches thereupon automatically retract, the shaft 16 follows the bottle down and the tapered part 38 of the barrel 37 engages with the adjustable bolts 36 to outwardly move and retain the levers 31 and wheels 35.

In this manner the cap is secured and sealed to the bottle which is then removed for the aforesaid cycle of operations to be repeated as often as desired.

The heretofore described apparatus may be modified to deal with press-on caps or closures instead of caps which are to be screw-threaded, in which event the wheels 35 and their operating means may be dispensed with. Alternatively, the caps may be screw-threaded prior to positioning upon bottles or containers.

I claim:

Apparatus for securing and shaping a tamperproof ductile metal cap to seal the mouth and threaded neck of a container comprising a frame support including a base, an intermediate column and a head, a vertically disposed central sleeve mounted on said head by a pair of horizontal parallel plates which are held between pillars at each side of said head, a shaft housed within said sleeve, spring means within said sleeve urging said shaft in downwardly extending position to project the shaft end beyond the lower end of said sleeve, the lower of said horizontal plates being centrally bored to accommodate the mouth and neck of a container, said central bore being along the same axis of said sleeve and shaft, a platform mounted on said base for supporting said container, power-operated plunger means imparting vertical reciprocating movement to said platform, said power operated plunger means comprising a plunger engaging a lower surface of said platform, an antifriction roller at the lower end of said plunger, a rotary cam engaging said antifriction roller at the lower end of said plunger to actuate said plunger, a driven shaft for moving said cam to reciprocate said plunger, and a motor operatively connected to said shaft, container locating means on said platform to position said container in relation to said central bore whereby upward movement of said platform by operation of said plunger will bring the mouth and neck of said container into and beyond the central bore of said lower horizontal plate, a grooved collar at the lower end of said sleeve adapted as a pulley to be belt driven from a motor and thereby rotate said sleeve and shaft, a ring secured concentrically about said collar, adjustable counterweights mounted on levers and oppositely placed on said ring about the lower end of said sleeve and shaft, a barrel-shaped forming member fitted with lower dished plate member to enclose and secure a ductile cap to the mouth of a container projecting about said central bore, rotatable flanged wheel die members mounted at the base of said counterweighted levers adapted to compress and deform the sides of the ductile cap placed over the mouth and neck of the container, the lower ends of said counterweighted levers moving radially inwardly by the action of centrifugal force upon the upward movement of said plunger to cause said wheel die members to deform the sides of the metal cap by the rotating movement of said sleeve, shaft and ring when driven by pulley action on the grooved collar by said motor, slidable dies mounted on said lower horizontal plate for inward radial movement to deform said cap and articulated links connected to said dies for automatically protracting said dies toward said cap upon upward movement of said plunger and retracting said dies upon downward movement of said plunger.

References Cited in the file of this patent
UNITED STATES PATENTS

| | | |
|---|---|---|
| 2,178,664 | Hogg | Nov. 7, 1939 |
| 2,237,614 | Perrone | Apr. 8, 1941 |

FOREIGN PATENTS

| | | |
|---|---|---|
| 906,070 | France | May 7, 1945 |